Jan. 29, 1957  J. CURLETT  2,779,346
UNLOADING VALVE
Filed Nov. 26, 1954  2 Sheets-Sheet 1

INVENTOR
John Curlett
BY
ATTORNEYS

Jan. 29, 1957  J. CURLETT  2,779,346
UNLOADING VALVE
Filed Nov. 26, 1954  2 Sheets-Sheet 2
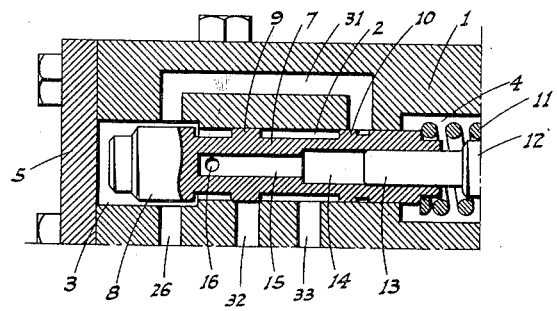
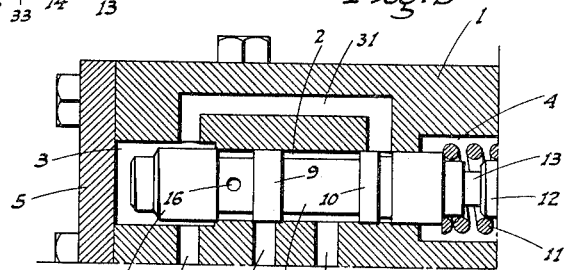
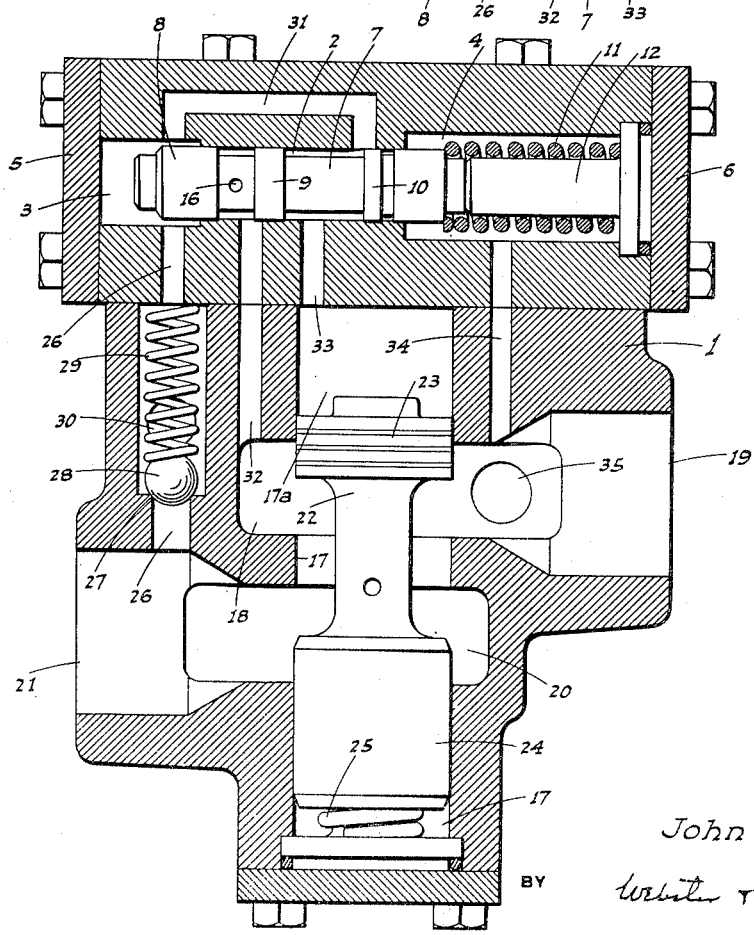
INVENTOR
John Curlett
BY
ATTORNEYS : 2,779,346
Patented Jan. 29, 1957

2,779,346

UNLOADING VALVE

John Curlett, Los Gatos, Calif., assignor, by mesne assignments, to Gurries Manufacturing Co., San Jose, Calif., a corporation of California Application November 26, 1954, Serial No. 471,358

5 Claims. (Cl. 137—108)

This invention relates to unloading valves for use in a hydraulic system which includes a constantly operating pump, and a pressure accumulator in which the pressure for operating the hydraulic ram or the like is stored while the pressure generated by the pump is circulated through the unloading valve without restraint between recurring pressure storing operations.

The unloading valve includes a bypass spool which prevents a return flow to the pump while the accumulator is being loaded, and a pilot spool actuated by accumulator pressure to enable the bypass spool to be moved by such pressure to allow of such return flow.

A major object of the invention is to arrange the pilot spool, the porting and passage means between such spool, the bypass spool, and the accumulator so that a full movement of the pilot spool takes place before the bypass spool is moved and such full movement of the pilot spool takes place with a sudden snap action. This avoids what may be termed a stall point, or a state of unequal equilibrium, in the action of the unloading valve.

Another object of the invention is to arrange the control of the pilot spool so that once the same is moved by a predetermined maximum accumulator pressure to cause the bypass spool to be moved to a bypassing or return flow position, said pilot spool will not return to its initial position, to allow the bypass spool to return to its initial position, until the accumulator pressure has dropped to a predetermined minimum, and a reloading cycle of the system is in order. There is thus no continuous undesirable fluttering of either spool from one position to the other, as would otherwise occur. There is therefore no extreme heat developed at the pump or in the system as a whole, even though the pump is in constant operation, since the oil circulated by the pump is freely bypassing between successive accumulator loading operations, which only take place after a certain period of use of the oil under relatively high pressure in the hydraulic ram or other work member of the system.

The novel unloading valve is particularly of advantage for implement control use, when a very small control valve movement must be employed, as in leveler blade adjustment.

A further object of the invention is to provide an unloading valve which is designed for ease and economy of manufacture.

Still another object of the invention is to provide a practical, reliable, and durable unloading valve, and one which will be exceedingly effective for the purpose for which it is designed.

These objects are accomplished by means of such structure and relative arrangement of parts as will fully appear by a perusal of the following specification and claims.

In the drawings:

Figs. 2 and 3 are fragmentary sectional elevations showing the pilot spool as moved to successive intermediate positions from the initial position.

Fig. 4 is a sectional elevation of the unloading valve, showing the pilot spool fully shifted and the bypass spool as shifted from its initial position to its bypass opening or unloading position.

Figure 1:
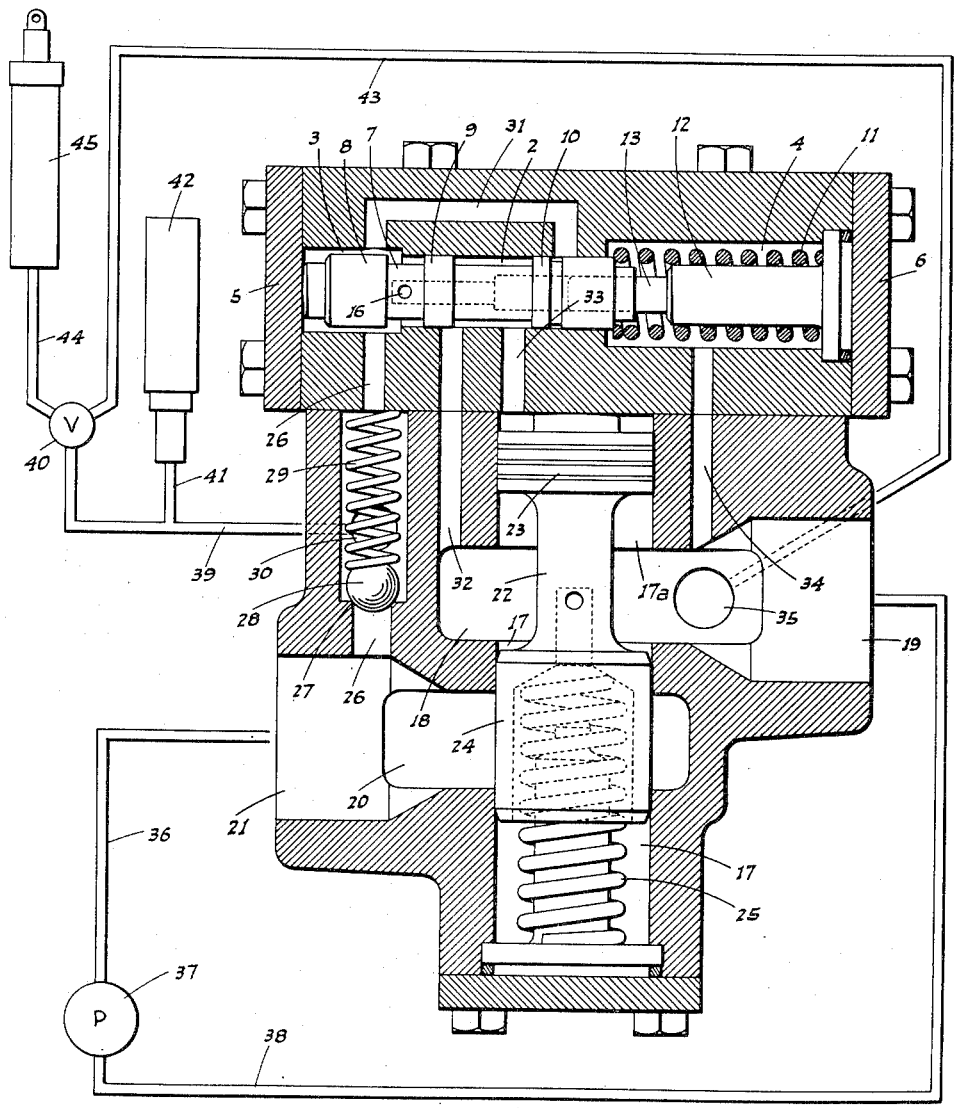
Fig. 1 is a sectional elevation of the improved unloading valve in its charging position and shown in connection with a conduit and operating system in diagrammatic form.

Referring now more particularly to the drawings, and to the characters of reference marked thereon, the unloading valve comprises a body 1 which, while actually formed of two main parts for convenience of manufacture and so shown, is considered herein as being a single member.

Formed in the upper portion of the body 1 is a longitudinal bore 2, which at one end includes a short portion 3 of enlarged diameter, and at the other end communicates with an elongated enlarged bore 4. The outer ends of the bore portion 3 and bore 4 are closed by end heads 5 and 6, respectively.

A pilot spool 7 is slidable in the bore 2, said spool including longitudinally spaced bore-fitting lands 8, 9, and 10, respectively, with land 8 initially wholly within the enlarged bore portion 3.

A compression spring 11 in the bore 4 bears against the adjacent end of the spool 7 and acts to initially force the spool so that its opposite end normally engages the end head 5. A stop post 12 is mounted in bore 4 and terminates short of said normal position of the spool, and a differential pin 13 projects from the inner end of the post and projects with a close sliding fit into a blind bore 14 in the spool 7; the inner end portion 15 of which bore is relatively small. A port 16 in the spool 7 between lands 8 and 9 communicates with said bore portion 15.

The body 1, below bore 2, is formed with a relatively large blind or closed-end bore 17 disposed at right angles to the bore 2, and which is intersected intermediate its ends by a main bypass or outlet return passage 18 leading to an outlet port 19 on one side of the body, and by a main pressure passage 20 below passage 18 and leading to an inlet port 21, preferably on the other side of the body.

A bypass spool 22 is disposed in bore 17; said spool including an upper-end piston 23 slidable in the portion above passage 18 (which portion forms a cylinder 17a), and a lower-end land 24 slidable in the bore and normally engaging or closing that portion of the same which extends between and connects the passages 18 and 20, as shown in Fig. 1. A compression spring 25 in the bore 17 below land 24 presses upwardly on the spool and normally holds the piston against the upper closed end of the cylinder 17a, with the land 24 then in said bore-portion closing position.

A secondary pressure passage 26 in the body 1 extends from bore portion 3 to pressure passage 20 and is formed, intermediate its ends, with a valve seat 27 facing bore 3 and normally engaged by a check ball 28 held down by a relatively light spring 29. A pressure intake port 30 leads into passage 26 above the ball.

A pressure bypass passage 31 leads from bore portion 3 to bore 2 just beyond land 10 of the pilot spool 7 when the latter is in its initial position. A return passage 32 leads to passage 18 from bore 2 at a point on the latter such as to be closed by land 9 after a relatively small movement of the spool 7 from said initial position. Another passage 33 leads from the upper end of cylinder 17a to bore 2 ahead of spool land 10, and intermediate the connection of passages 32 and 31 with said bore.

For lubrication purposes a passage 34 leads from passage 18 to bore portion 4, and a return-pressure port 35 communicates with said passage 18.

The unloading valve is interposed in an operating system in the following manner:

A pressure supply conduit 36 leads from a pump 37 to intake port 21, while a return conduit 38 leads from port 19 back to the pump. A secondary pressure conduit 39 leads from port 30 to a three-way control valve 40, with a lateral 41 leading to a pressure reservoir or accumulator 42 of spring or air loaded type. A secondary return conduit 43 leads from valve 40 back to port 35, and a combined pressure and return conduit 44 leads from valve 40 to a single acting ram 45 or similar work member.

In operation, with the valve spools in the position shown in Fig. 1 the pressure generated by the pump and forced into port 21 is blocked from returning to the pump by the land 24 of bypass spool 22. The pressure therefore acts on ball 28 to open the same, admitting pressure to passage 26 and passing through port 30 and conduits 39 and 41 to the accumulator 42 and builds up therein.

This accumulated pressure also of course passes through passage 26 to bore 3, entering the bore 14 of spool 7 through port 16. This pressure acts both on the spool 7 tending to advance the same against the resistance of spring 11, and also acts on the differential pin 13 within the spool bore 14, which tends to aid the spring in resisting spool movement.

There will, however, be no spool movement until the pressure has built up above a predetermined low an amount sufficient to overcome the spring 11 and advance the spool 7. With the initial spool movement the passage 32 is first blocked off by the land 9, while the port 16 is still in communication with passage 26, as shown in Fig. 2. With a further building up of pressure and advance of the spool, land 8 moves into bore 2 to shut off the pressure supply to port 16 so that the pressure against the differential pin 13 is discontinued; the rear end of land 9 almost uncovering the passage 32, as shown in Fig. 3.

With a further increase of accumulator pressure acting against the spool 7 as such pressure reaches its kick-out or unloading maximum, the spool first moves from the position of Fig. 3 sufficient for land 9 to open passage 32, allowing the pressure within the spool bore 14 to escape into the main return passage 18. Thereafter, the only force opposing the advance of pilot spool 7 is the spring 11, which at this point of compression requires far less pressure to hold it than the predetermined maximum pressure now available in the system.

The pilot spool, once the passage 32 is opened and the pressure therein is relieved, advances or snaps forward with a rapid motion until it engages the stop post 12.

During this movement the land 10 uncovers the adjacent end of pressure passage 31, placing the latter in communication with passage 33. The accumulator pressure therefore passes into cylinder 17a and acts on piston 23 to lower the spool 22 against the resistance of the spring 25. This lowers the land 24 so that the portion of bore 17 between passages 18 and 20 is opened, as shown in Fig. 4.

The return to the pump through the return conduit 38 is therefore unrestricted, and since the intake and outlet ports 21 and 19 and the corresponding passages 20 and 18, and the conduits 36 and 38, are relatively large, the pump will bypass at very low pressure, while the accumulator pressure is held back by the check-ball 28, which immediately closes as soon as the spool 22 is shifted.

The system then functions on the high-pressure oil stored in the accumulator.

When it is desired to operate the ram 45, the valve 40 is manipulated to admit such high pressure oil to or relieve the same from the ram; the relieved oil returning to passage 18 by way of conduit 43 and port 35.

As the accumulator pressure drops due to the continued removal of the oil after use in the ram, the spool 7 remains in its fully advanced position until the accumulator pressure has dropped below that of spring 11. The spool then starts to retract, the land 10 first shutting off communication between passages 31 and 33; the pressure being held within cylinder 17a against piston 23. With a further drop of accumulator pressure the spool land 9 first closes passage 32 and land 8 then moves to readmit pressure to port 16. Such pressure then acts against the differential pin 13; aiding the spring 11 and causing the spool to snap back to its initial fully retracted position.

In this position of the spool, land 9 opens the passage 32 so that the confined oil within cylinder 17a above the piston 23 can escape through passage 33, bore 2, and passage 32 to return passage 18. The spring 25 is of course then free to act and force spool 22 up, again shutting off communication between pressure passage 20 and return passage 18. The valve spools are then in the initial position shown in Fig. 1, and another charging cycle starts, since the pump is continuously operating.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An unloading valve comprising a body having separated main pressure intake and outlet passages and a bore intersecting and connecting the passages, a bypass spool having a land initially closing said bore to prevent a flow from the intake to the outlet passage, another closed-end bore in the body, a pilot spool slidable in said other bore, a spring acting on the pilot spool tending to hold the same at one end of the other bore, a secondary pressure passage connecting the main pressure passage and the other bore adjacent said one end thereof, the pilot spool being arranged so that pressure admitted to said other bore from the secondary pressure passage tends to advance the pilot spool away from said one end of the bore in opposition to the spring, a normally closed check valve in said secondary passage opening toward the other bore, a relatively high pressure intake port in said secondary passage between the check valve and the second bore, pressure actuated means to shift the land of the bypass spool to a bore opening position and including a passage communicating with said other bore, and means formed with the pilot spool and body to admit pressure from the secondary pressure passage to the last named passage only upon such pressure being sufficient to overcome the spring and advance the pilot spool a predetermined distance from said one end of the second bore.

2. A valve, as in claim 1, in which said pressure actuated means comprises a piston formed with the bypass spool beyond the land thereof, a cylinder in which the piston is slidable and with which the last named passage connects so that the pressure therein will act on the adjacent end of the piston to move the same in said spool-land opening direction, the spool-land when closed shutting off the adjacent end of the cylinder; there being a spring acting on the bypass spool in opposition to pressure within the cylinder.

3. A valve, as in claim 1, including means operatively associated with the pilot spool arranged so that pressure acting on said spool and tending to advance the same will aid the spring in resisting such movement until said spool has moved a predetermined portion of said predetermined distance.

4. An unloading valve comprising a body having separated main pressure intake and outlet passages and a bore intersecting and connecting the passages, a bypass spool having a land initially closing said bore to prevent a flow from the intake to the outlet passage and a piston beyond the land, a cylinder in which the piston is slidable, another closed-end bore in the body, a secondary pressure passage connecting said other bore and the main pressure intake passage, a normally closed check valve in the secondary pressure passage opening toward said other bore, a secondary relatively high pressure intake port in the secondary pressure passage between the check valve and said other bore, a pilot spool slidable in said other bore, a spring acting on the pilot spool normally holding the same at one end of said other bore, a return passage between the main pressure outlet and said other bore, a third pressure passage between said other bore and the cylinder arranged so that pressure admitted to the cylinder will tend to move the piston in a direction such that the land of the bypass spool will open the first named bore, a bypass pressure passage connected at its ends to said other bore to communicate with the secondary pressure passage and with the third pressure passage, and lands on the pilot spool arranged so that when the said spool is at said one end of said other bore, communication is shut off between the bypass passage and the third pressure passage and established between said third passage and the return passage, and when the pilot spool is advanced a predetermined distance from said one end of the bore, communication is established between said third pressure passage and the bypass passage and is shut off between said third passage and the return passage; the pilot spool and secondary pressure passage being arranged so that the spool will be advanced said predetermined distance against the opposition of the spring by predetermined pressure within the secondary pressure passage.

5. A valve, as in claim 3, in which said last named means includes a blind bore in the pilot spool open to the end thereof furthest from said one end of said other bore, a differential pin fixed in the body and projecting into the blind bore from said open end thereof in close slidable relation, said blind bore having a port beyond the inner end of the pin open to the surface of the spool, said other bore having a main portion and an enlarged portion at said one end thereof and the secondary pressure passage leading to said enlarged bore portion, a land on the pilot spool slidable into the main bore portion but initially disposed wholly within the enlarged bore portion whereby pressure within said portion has access to the adjacent end of the main portion of such bore, a second land beyond the first land slidable within the main bore portion, the port being positioned between the lands, and a return passage extending from the main outlet passage to said other bore and arranged relative to the lands so as to be shut off from the port by the second land when the pilot spool is at said one end of the bore, and to be opened to said port only upon advancing movement of the pilot spool sufficient to cause the first land to engage the main bore portion and shut off the enlarged bore portion from communication with the port.

References Cited in the file of this patent

UNITED STATES PATENTS

| | | |
|---|---|---|
| 1,288,578 | Hatfield et al. | Dec. 24, 1918 |
| 2,264,375 | Hill et al. | Dec. 2, 1941 |
| 2,473,953 | Huber et al. | June 21, 1949 |
| 2,580,128 | Renick | Dec. 25, 1951 |
| 2,683,966 | Tyler | July 20, 1954 |